US008424188B2

(12) United States Patent
Wang et al.

(10) Patent No.: US 8,424,188 B2
(45) Date of Patent: Apr. 23, 2013

(54) METHOD OF MANUFACTURING AN END RING OVER PRE-FORMED CONDUCTOR BARS OF A ROTOR FOR AN ELECTRIC DEVICE

(75) Inventors: Qigui Wang, Rochester Hills, MI (US); Richard J. Osborne, Shelby Township, MI (US); Yucong Wang, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 270 days.

(21) Appl. No.: 13/032,771

(22) Filed: Feb. 23, 2011

(65) Prior Publication Data

US 2012/0210563 A1 Aug. 23, 2012

(51) Int. Cl.
*H02K 15/02* (2006.01)
*H02K 15/10* (2006.01)
(52) U.S. Cl.
USPC .............................................. 29/598; 29/596

(58) Field of Classification Search ................... 29/598, 29/596; 310/42, 125, 211, 212, 216.109, 310/216.111
See application file for complete search history.

(56) References Cited

U.S. PATENT DOCUMENTS

| 6,088,906 | A | 7/2000 | Hsu et al. | |
|---|---|---|---|---|
| 8,181,333 | B2 * | 5/2012 | Alfermann et al. | ............. 29/598 |
| 2010/0243197 | A1 * | 9/2010 | Osborne et al. | ............... 164/520 |

* cited by examiner

*Primary Examiner* — Thiem Phan
(74) *Attorney, Agent, or Firm* — Quinn Law Group, PLLC

(57) ABSTRACT

A method of manufacturing a rotor assembly includes positioning a laminated stack of electric steel sheets with a plurality of conductor bars positioned within longitudinal grooves defined by the laminated stack in a mold, and casting an end ring in place over ends of the conductor bars. In order to cast the end ring in place, heated liquid aluminum is injected into a cavity defining the end ring, and circulated within the cavity and around the ends of the conductor bars to create relative movement between the liquid aluminum and the ends of the conductor bars to heat the conductor bars and flush oxides away from an outer surface of the conductor bars.

20 Claims, 4 Drawing Sheets

METHOD OF MANUFACTURING AN END RING OVER PRE-FORMED CONDUCTOR BARS OF A ROTOR FOR AN ELECTRIC DEVICE

TECHNICAL FIELD

The method generally relates to a method of manufacturing a rotor assembly for an electric device.

BACKGROUND

Rotor assemblies for an electric device, including but not limited to an induction electric motor, typically include a laminated stack of electric steel sheets that support a plurality of conductor bars disposed within longitudinal grooves defined by the laminated stack of electric steel sheets. The conductor bars extend outward beyond axial end surfaces of the laminated stack of electric steel sheets. The rotor assembly includes a first end ring and a second end ring disposed at the opposite axial end surfaces of the laminated stack of electric steel sheets. The first end ring and the second end ring electrically connect the ends of the conductor bars at the respective axial end surfaces of the laminated stack of electric steel sheets. The first end ring and the second end ring may be cast in place from aluminum over the ends of pre-formed conductor bars that re positioned in the longitudinal grooves of the laminated stack.

When the first end ring and the second end ring are cast in place over pre-formed conductor bars, interfacial bonding between the cast end rings and the pre-formed conductor bars, i.e., the bond between the cast end rings and the pre-formed conductor bars, is critical to the integrity of the rotor assembly. For example, if aluminum oxides are present on the pre-formed conductor bars when the end rings are cast in place, the aluminum oxides may prevent and/or reduce the quality of the bond between the cast in place end rings and the pre-formed conductor bars.

SUMMARY

A method of manufacturing a rotor assembly for an electric device is provided. The method includes stacking a plurality of laminated electric steel sheets. The laminated electric steel sheets define a laminated stack having a first end surface and a second end surface axially spaced from the first end surface along a central axis. A plurality of longitudinal grooves extend along the central axis between the first end surface and the second end surface. The plurality of grooves are angularly spaced about and equidistant from the central axis. One of a plurality of conductor bars is positioned in each of the plurality of longitudinal grooves such that a first end of each of the plurality of conductor bars extends outward beyond the first end surface of the laminated stack. The laminated stack and the conductor bars are positioned in a mold having a first cavity that defines a first end ring. Liquid aluminum, having a temperature greater than approximately six hundred sixty degrees Celsius (660° C.), is injected into the first cavity of the mold. The liquid aluminum is circulated within the first cavity and around the first ends of the conductor bars. Circulating the liquid aluminum heats the conductor bars to a temperature equal to or greater than approximately three hundred fifty degrees Celsius (350° C.), which reduces a bond strength between the conductor bars and any oxides formed on an outer surface of the conductor bars, and fractures any oxide films on the outer surface of the conductor bars. The method further includes flushing the oxides away from the outer surface of the conductor bars with the circulating liquid aluminum, and cooling the liquid aluminum within the mold to form a first end ring over the first ends of the conductor bars.

A method of manufacturing a rotor assembly for an electric device is also provided. The method includes stacking a plurality of laminated electric steel sheets. The laminated electric steel sheets define a laminated stack having a first end surface and a second end surface axially spaced from the first end surface along a central axis. A plurality of longitudinal grooves extend along the central axis between the first end surface and the second end surface. The plurality of grooves are angularly spaced about and equidistant from the central axis. One of a plurality of conductor bars is positioned in each of the plurality of longitudinal grooves such that a first end of each of the plurality of conductor bars extends outward beyond the first end surface of the laminated stack. The laminated stack and the conductor bars are positioned in a mold having a first cavity that defines a first end ring. Liquid aluminum, having a temperature greater than approximately six hundred sixty degrees Celsius (660° C.), is injected into the first cavity of the mold. The liquid aluminum is circulated within the first cavity and around the first ends of the conductor bars. Circulating the liquid aluminum generates relative movement between the liquid aluminum and the first ends of the conductor bars to heat the conductor bars to a temperature equal to or greater than approximately three hundred fifty degrees Celsius (350° C.). Heating the conductor bars reduces a bond strength between the conductor bars and any oxides formed on an outer surface of the conductor bars, and fractures any oxide films on the outer surface of the conductor bars. The liquid aluminum is circulated at a speed sufficient to create a drag force on the oxides disposed on the outer surface of the conductor bars that is greater than the bond strength between the oxides and the conductor bars. The liquid aluminum is circulated at a speed that is less than a critical speed to prevent surface turbulence within the liquid aluminum adjacent the surface of the conductor bars. The speed of the liquid aluminum circulating through the first cavity is controlled to maintain the drag force at a level greater than the bond strength while not exceeding the critical velocity of the liquid aluminum. The method further includes flushing the oxides away from the outer surface of the conductor bars with the circulating liquid aluminum, and cooling the liquid aluminum within the mold to form a first end ring over the first ends of the conductor bars.

Accordingly, the heated liquid aluminum is injected into the first cavity of the mold and caused to circulate within the first cavity of the mold about the first ends of the conductor bars. As the heated liquid aluminum circulates through the first ends of the conductor bars, the heated liquid aluminum quickly heats the conductor bars to a temperature of at least three hundred fifty degrees Celsius (350° C.). The difference in thermal expansion between any oxides formed on the conductor bars and the conductor bars themselves causes existing oxide films on the outer surface of the conductor bars to fracture. Additionally, heating the oxides reduces the bond strength between the oxides and the conductor bars. The fracture of the oxide film and the reduced bond strength between the oxides and the conductor bars allows the circulating liquid aluminum to flush the oxides away from the outer surface of the conductor bars, thereby allowing a high quality bond between the liquid aluminum and the conductor bars once the liquid aluminum cools.

The above features and advantages and other features and advantages of the present invention are readily apparent from

DETAILED DESCRIPTION

Referring to the Figures, wherein like numerals indicate like parts throughout the several views, a rotor assembly is shown generally at 20. The rotor assembly 20 is for an electric device, including but not limited to an induction electric motor. The rotor assembly 20 may commonly be referred to as a squirrel cage type rotor assembly 20.

Figure 1:
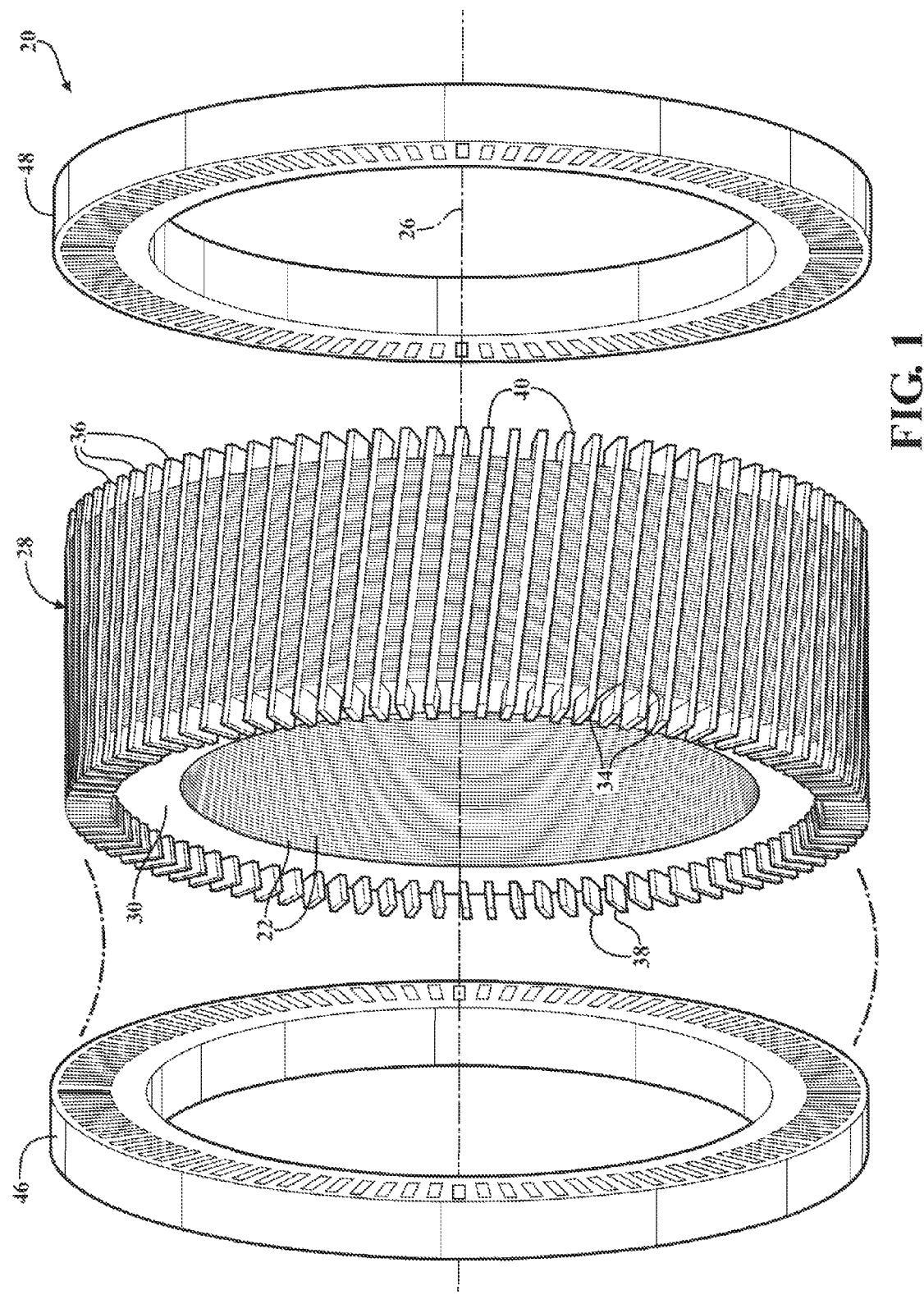
FIG. 1 is a schematic partially exploded perspective view of a rotor assembly.
Figure 3:
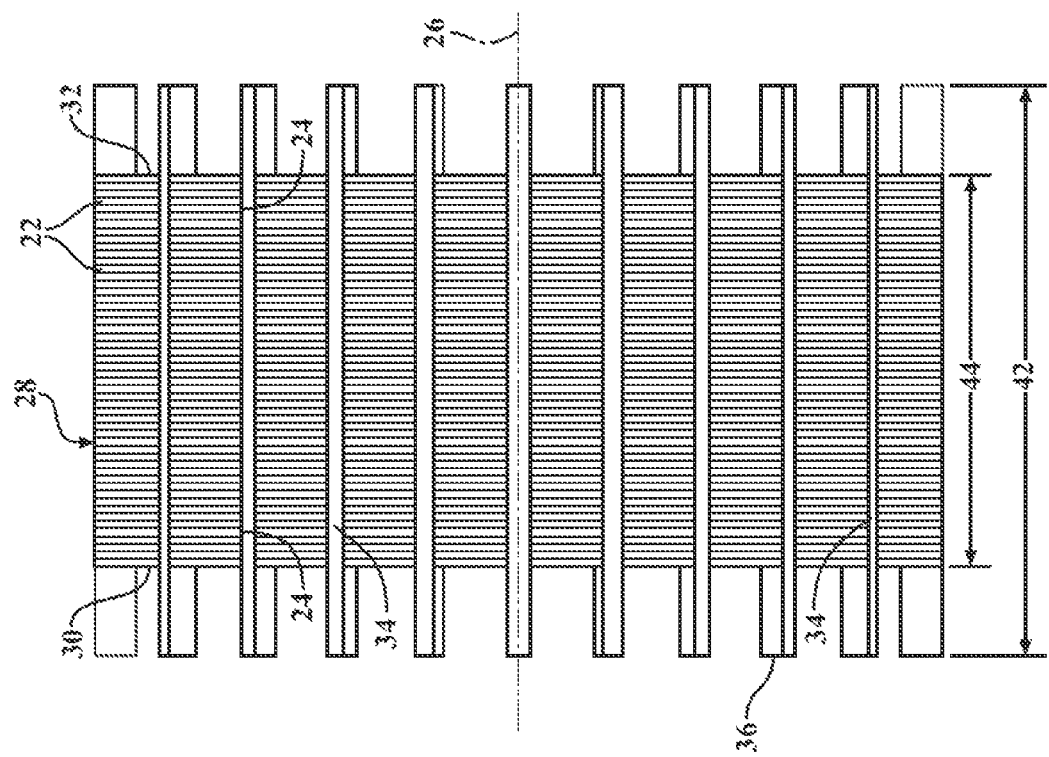
FIG. 3 is a schematic plan view of an electric steel sheet of the rotor assembly.
Figure 2:
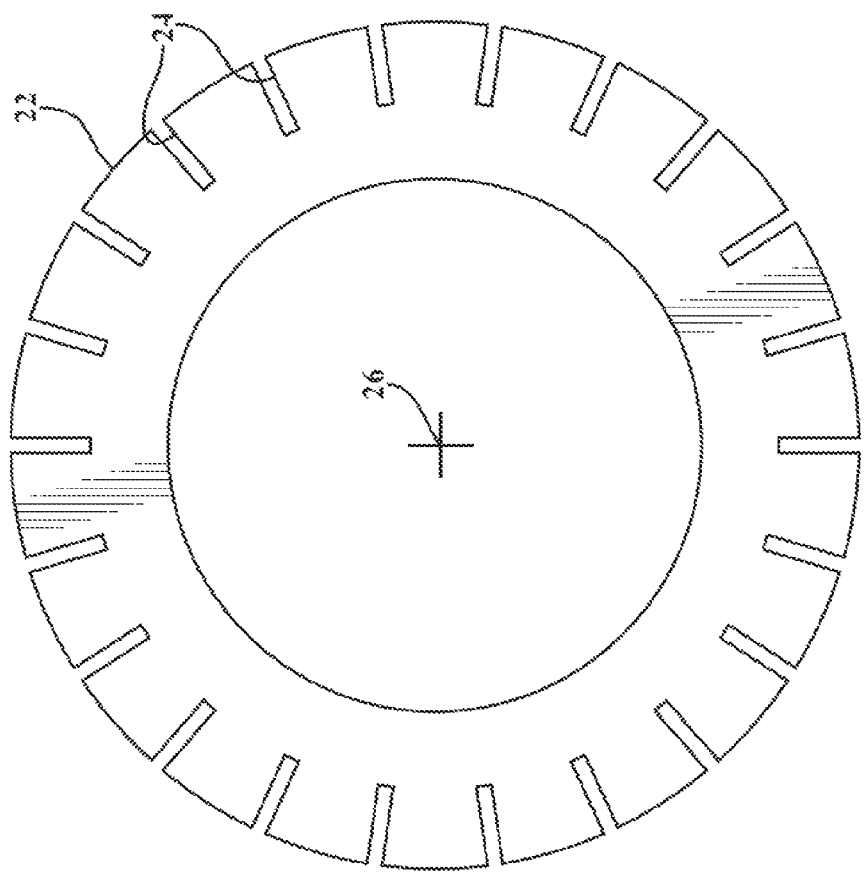
FIG. 2 is a schematic plan view of a laminated stack of the electric steel sheets.

Referring to FIGS. 1 and 2, the rotor assembly 20 includes a plurality of electric steel sheets 22. Referring to FIG. 3, each of the electric steel sheets 22 defines a plurality of slots 24. The slots 24 are disposed angularly about and equidistant from a central axis 26, near an outer periphery of the electric steel sheets 22. Referring back to FIGS. 1 and 2, the electric steel sheets 22 are disposed adjacent each other and concentric about the central axis 26 to define a laminated stack 28. The laminated stack 28 includes a first end surface 30 and a second end surface 32. The second end surface 32 is spaced from the first end surface 30 along the central axis 26. The first end surface 30 and the second end surface 32 define opposing axial end surfaces of the laminated stack 28 of electric steel sheets 22. The slots 24 are aligned to define a plurality of longitudinal grooves 34 in the laminated stack 28. The longitudinal grooves 34 extend between and connect the first end surface 30 and the second end surface 32. As is known, the longitudinal grooves 34 may be slightly skewed along a length of the laminated stack 28 of electric steel sheets 22. The electric steel sheets 22 may include and be manufactured from, but are not limited to, a low carbon iron having a high silicon content to reduce eddie current loss, and may be coated with an insulating compound to reduce circulating current that may result in further eddie current loss.

The rotor assembly 20 further includes a plurality of conductor bars 36. One of the conductor bars 36 is disposed within each of the plurality of longitudinal grooves 34. The conductor bars 36 may include and be manufactured from, but are not limited to pure aluminum, a wrought aluminum alloy, an aluminum composite, copper, a copper alloy, or some other conductive material. The conductor bars 36 include a melting point of at least six hundred degrees Celsius (600° C.) to ensure that the conductor bars 36 do not melt while casting end rings for the rotor assembly 20, which is described in greater detail below. Each of the plurality of conductor bars 36 includes a first end 38 and a second end 40. The first end 38 extends axially beyond the first end surface 30 of the laminated stack 28 along the central axis 26. The second end 40 extends axially beyond the second end surface 32 of the laminated stack 28 along the central axis 26. Accordingly, it should be appreciated that the conductor bars 36 include a conductor length 42 along the central axis 26 that is greater than a stack length 44 of the laminated stack 28 of electric steel sheets 22 along the central axis 26.

Each of the conductor bars 36 may include a uniform cross sectional shape perpendicular to the central axis 26 between the first end surface 30 and the second end surface 32 of the laminated stack 28. As shown, the uniform cross sectional shape of the conductor bars 36 between the first end surface 30 and the second end surface 32 includes a rectangular shape. However, it should be appreciated that the uniform cross sectional shape may include some other shape not shown or described herein.

A first end ring 46 is disposed against and abuts the first end surface 30 of the laminated stack 28 of electric steel sheets 22. The first end ring 46 at least partially surrounds and electrically connects the first end 38 of each of the conductor bars 36. A second end ring 48 (shown only in FIG. 1) is disposed against and abuts the second end surface 32 of the laminated stack 28 of electric steel sheets 22. The second end ring 48 at least partially surrounds and electrically connects the second end 40 of each of the conductor bars 36.

The first end ring 46 and the second end ring 48 are each cast in place over the first ends 38 of the conductor bars 36 and the second ends 40 of the conductor bars 36 respectively. Preferably, the first end ring 46 and the second end ring 48 are cast in place from pure aluminum or a cast aluminum alloy. However, it should be appreciated that the first end ring 46 and the second end ring 48 may be cast in place from some other conductive material. The first end ring 46 and the second end ring 48 may be cast using any suitable casting process known to those skilled in the art, including but not limited to a squeeze casting process, a high pressure die casting process, a low pressure die casting process or a sand casting process.

A method of manufacturing the rotor assembly 20 is also disclosed. The method includes stacking the plurality of laminated electric steel sheets 22 together to define the laminated stack 28. As described above, the laminated stack 28 includes the first end surface 30 and the second end surface 32. The second end surface 32 is axially spaced from the first end surface 30 along the central axis 26. The electric steel sheets 22 are laminated together in such a manner so that the slots 24 in each of the electric steel sheets 22 cooperate together to define the longitudinal grooves 34 extending along the central axis 26, between the first end surface 30 and the second end surface 32, with the grooves 34 angularly spaced about and equidistant from the central axis 26.

The method further includes positioning one of the conductor bars 36 in each of the longitudinal grooves 34. The conductor bars 36 are positioned such that the first end 38 and the second end 40 of each of the plurality of conductor bars 36 extend outward beyond the first end surface 30 and the second end surface 32 of the laminated stack 28 respectively.

The method described below describes the casting of the first end ring 46 over the first ends 38 of the conductor bars 36. However, it should be appreciated that while not specifically described, the method is also applicable to casting the second end ring 48 over the second ends 40 of the conductor bars 36 as well.

The method may further include brushing the first ends 38 of each of the conductor bars 36 to remove at least a portion of any oxides, i.e., aluminum oxides, disposed on an outer surface of the conductor bars 36. The first ends 38 of the conductor bars 36 may be brushed through mechanical means in any suitable manner. Brushing the first ends 38 of the conductor bars 36 assists in breaking up and/or removing the oxide film that typically exits on the outer surface of the conductor bars 36.

The method further includes placing the laminated stack 28 with the plurality of conductor bars 36 positioned therein in a mold or form. The mold includes a first cavity that defines the first end ring 46, and a second cavity that defines the second end ring 48. The mold may include any suitable shape and/or size for casting the first end ring 46 and/or the second end ring 48, and may depend upon the casting process utilized to cast the first end ring 46 and/or the second end ring 48.

The method further includes injecting liquid aluminum into the first cavity of the mold. The liquid aluminum may include but is not limited to one of a pure aluminum material, a conductor grade aluminum wrought alloy material, a cast aluminum alloy material. Prior to injection into the first cavity, the liquid aluminum is heated to temperature greater than approximately six hundred sixty degrees Celsius (660° C.). The liquid aluminum is injected into the first cavity in any suitable manner, which may depend upon the specific casting process being employed.

Figure 4:
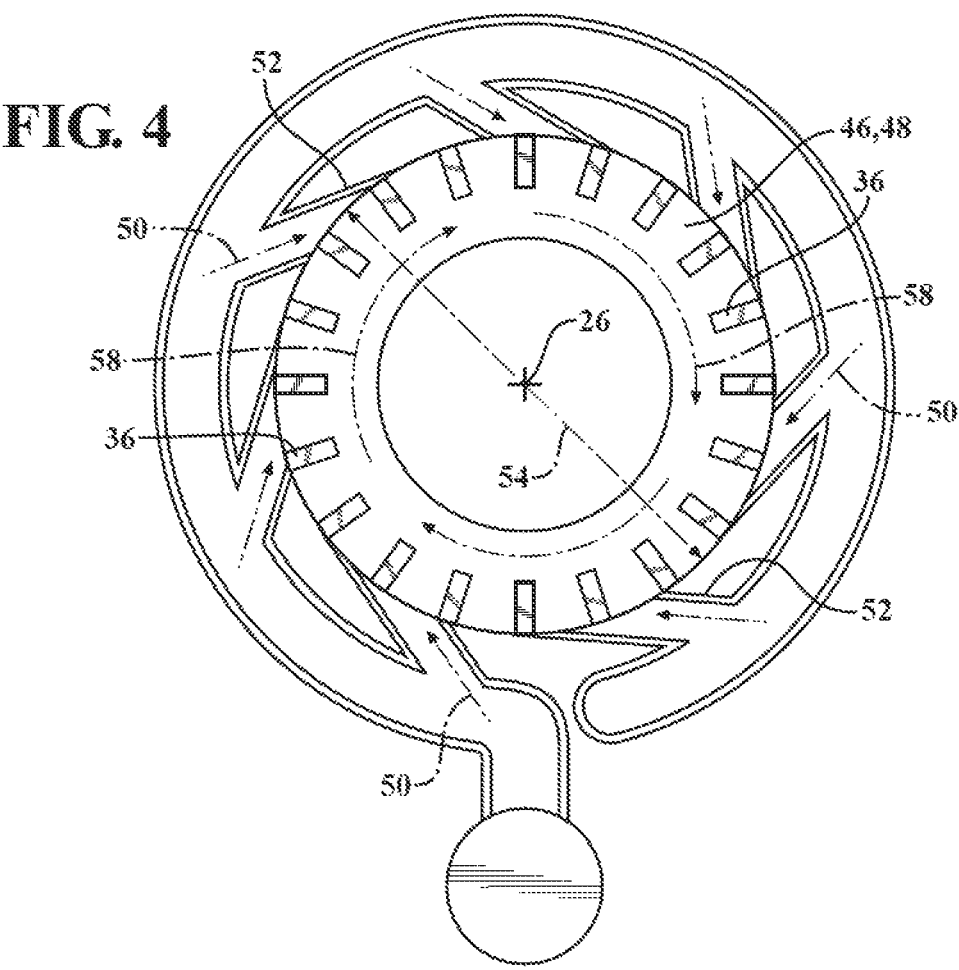
FIG. 4 is a schematic plan view of a mold for casting an end ring of the rotor assembly showing a plurality of tangential ingates disposed on an outer diameter of the rotor assembly.
Figure 5:
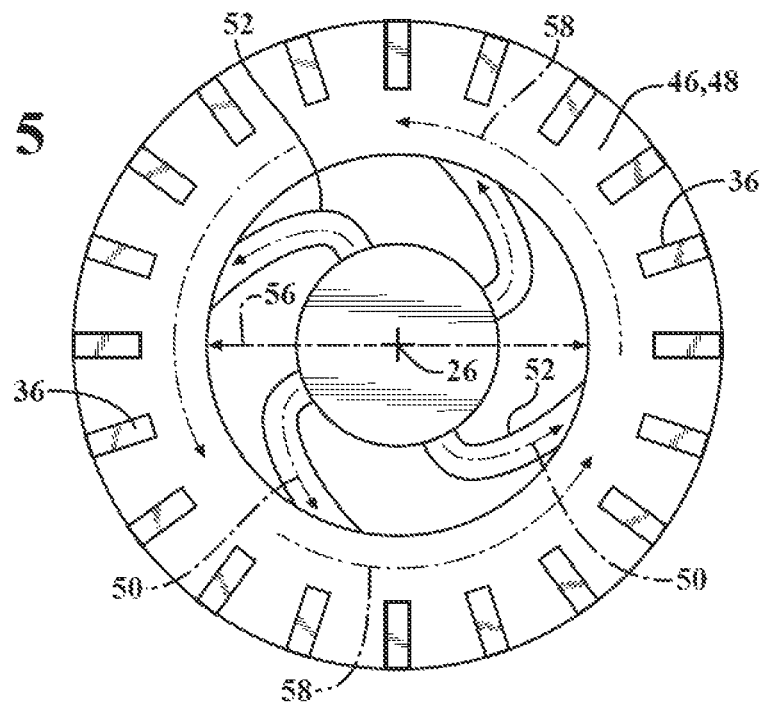
FIG. 5 is a schematic plan view of a mold for casting the end ring of the rotor assembly showing a plurality of tangential ingates disposed on an inner diameter of the rotor assembly.

Referring to FIGS. 4 and 5, injecting the liquid aluminum may include injecting the liquid aluminum, generally indicated by flow arrow 50, tangentially into the first cavity through a tangentially oriented ingate 52. The tangentially oriented ingate 52 may be disposed on one of an outer diameter 54 of the first cavity, shown in FIG. 4, or an inner diameter 56 of the first cavity, shown in FIG. 5. As such, injecting the liquid aluminum into the first cavity may further be defined as injecting the liquid aluminum into the first cavity through at least one tangentially oriented ingate 52 disposed on the outer diameter 54 of the first cavity, or injecting the liquid aluminum into the first cavity through at least one tangentially oriented ingate 52 disposed on the inner diameter 56 of the first cavity. Injecting the liquid aluminum tangentially into the first cavity induces an annular or circular flow of the liquid aluminum within the first cavity and about the first ends 38 of the conductor bars 36, generally indicated by flow arrow 58. Accordingly, the liquid aluminum flows annularly around the first cavity within the mold, thereby continuously flowing past the first ends 38 of the conductor bars 36.

The liquid aluminum circulates within the first cavity and around the first ends 38 of the conductor bars 36 to heat the conductor bars 36 and the oxides formed thereon to a temperature equal to or greater than three hundred fifty degrees Celsius (350° C.). Heating the conductor bars 36 and the oxides formed thereon to 350° C. reduces a bond strength between the conductor bars 36 and the oxides formed on the outer surface of the conductor bars 36. Furthermore, heating the conductor bars 36 and the oxides formed thereon to 350° C. causes the oxide film layer to fracture, making removal of the oxide film layer easier. The oxide film layer fractures due to the difference in thermal expansion between the conductor bars 36 and the oxide film on the conductor bars 36, i.e., the oxide film expands at a different rate than the conductor bars 36, causing the oxide film to fracture and break up.

Circulating the liquid aluminum includes generating relative movement between the liquid aluminum and the first ends 38 of the conductor bars 36. The relative movement between the liquid aluminum and the first ends 38 of the conductor bars 36 may be achieved by moving the liquid aluminum to generate relative movement between the liquid aluminum and the first ends 38 of the conductor bars 36, or may be achieved by moving the conductor bars 36 to generate relative movement between the liquid aluminum and the first ends 38 of the conductor bars 36.

The liquid aluminum is circulated at a speed sufficient to create a drag force on the oxides disposed on the outer surface of the conductor bars 36 that is greater than the bond strength between the oxides and the conductor bars 36. Circulating the liquid aluminum at a speed sufficient to generate the drag force greater than the bond strength allows the circulating liquid aluminum to strip away the oxides from the outer surface of the conductor bars 36. The drag force may be calculated by Equation 1 below:

$$F_D = \frac{1}{2} C_D \rho V^2 A \qquad 1)$$

wherein $F_D$ is the drag force, $C_D$ is a drag coefficient, p is the fluid density of the liquid aluminum, V is the velocity of the liquid aluminum circulating within the first cavity, and A is the interfacial area between the circulating liquid aluminum and the first ends 38 of the conductor bars 36. The drag coefficient $C_D$ is a dimensionless number, which depends upon the shape of the solid object and perhaps upon the Reynolds Number for the liquid aluminum. For turbulent flow parallel to a flat plate, the drag coefficient $C_D$ is equal to 0.005, while for laminar flow parallel to a flat plate, the drag coefficient $C_D$ is equal to 0.001. The velocity (V) of the liquid aluminum may be calculated by Equation 2 below:

$$V = \left(\frac{2\sigma_b}{C_D \rho}\right)^{1/2} \qquad 2)$$

wherein $\sigma_b$ is the bond strength between the oxides and the conductor bars 36.

The liquid aluminum is circulated within the first cavity at a speed less than a critical speed. The critical speed is the speed above which turbulence develops in the circulating liquid aluminum. Circulating the liquid aluminum at a speed below the critical speed prevents surface turbulence within the liquid aluminum adjacent the surface of the conductor bars 36. The critical speed may be calculated by Equation 3 below:

$$V_{crit} = 2(\gamma g/\rho)^{1/4} \qquad 3)$$

wherein $V_{crit}$ is equal to the critical speed at which surface turbulence within the liquid aluminum adjacent the surface of the conductor bars 36 develops, γ is the surface tension of the liquid aluminum, g is the acceleration of gravity, and ρ is the density of the liquid aluminum.

The method includes controlling the speed of the liquid aluminum circulating within the first cavity. The speed of the liquid aluminum may be controlled in any suitable manner. For example, the speed of the liquid aluminum may be controlled by adjusting at least one of an injection pressure of the liquid aluminum, a cross sectional area of one or more injection ingates, or a number of injection ingates through which the liquid aluminum is injected into the first cavity. It should be appreciated that increasing the injection pressure, increasing the size of one or more of the injection ingates, or increasing the number of injection ingates used increases the flow of the liquid aluminum within the first cavity, thereby increasing the speed of the liquid aluminum. Similarly, decreasing the injection pressure, decreasing the size of one or more of the injection ingates, or decreasing the number of injection ingates used decreases the flow of the liquid aluminum within the first cavity, thereby decreasing the speed of the liquid aluminum.

The method further includes flushing the oxides away from the outer surface of the conductor bars 36 with the circulating liquid aluminum. As noted above, the liquid aluminum circulates within the first cavity and around the first ends 38 of the conductor bars 36 at speeds sufficient to generate a drag force large enough to break the bond between the oxides and the conductor bars 36. Once these bonds are broken, the liquid aluminum flushes, i.e., carries away the oxides, leaving a clean surface for the liquid aluminum to bond to.

The method further includes cooling the liquid aluminum within the mold to form a first end ring 46 over the first ends 38 of the conductor bars 36. Once the oxides have been flushed from the outer surface of the conductor bars 36, the liquid aluminum may be allowed to cool. As the liquid aluminum cools and the viscosity of the liquid aluminum increases, it should be appreciated that the amount of circulation within the first cavity and around the first ends 38 of the conductor bars 36 decreases to zero, thereafter the liquid aluminum solidifies around the first ends 38 of the conductor bars 36, thereby providing the cast in place first end ring 46.

Figure 6:
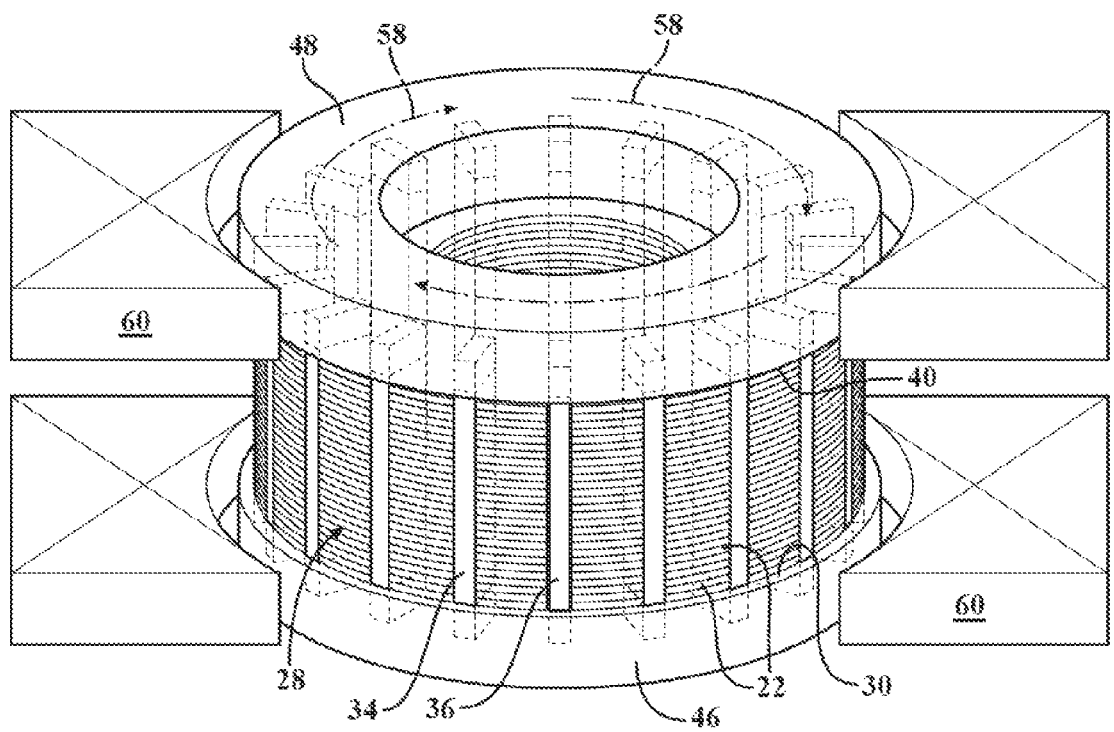
FIG. 6 is a schematic plan view showing a method of applying a magnetic force to liquid aluminum in order to rotate the liquid aluminum relative to the laminated stack.
Figure 7:
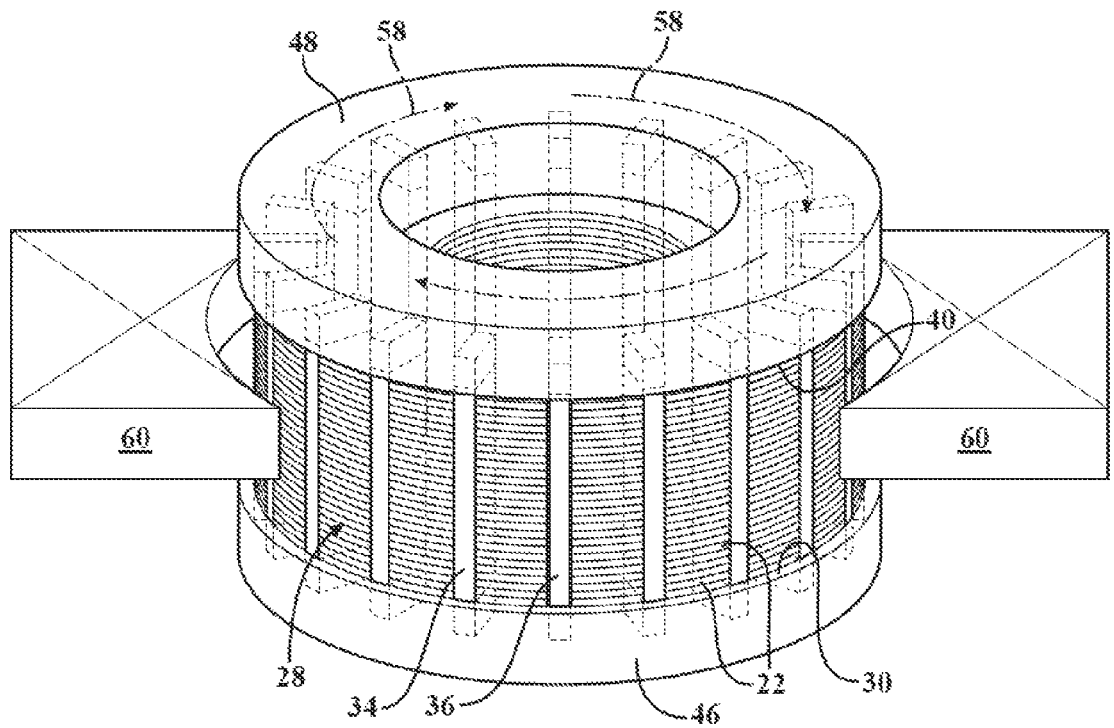
FIG. 7 is a schematic plan view showing a method of applying a magnetic force to the laminated stack to rotate the laminated stack relative to liquid aluminum.

Alternatively, referring to FIGS. 6 and 7, circulating the liquid aluminum within the first cavity may include applying a magnetic force to one of the liquid aluminum in the first cavity or the laminated stack 28 to generate rotation in the one of the liquid aluminum or the laminated stack 28 relative to the other of the liquid aluminum and the laminated stack 28. The magnetic force is applied by one or more magnetic coils 60 positioned to cause movement in one of the liquid aluminum or the laminated stack 28. The relative rotation produces relative movement between the liquid aluminum and the conductor bars 36. As such, when the magnetic force is applied to achieve the relative movement between the liquid aluminum and the conductor bars 36, the liquid aluminum need not be injected into the first cavity of the mold through the tangentially oriented ingates 52 shown in FIGS. 4 and 5, but may be injected through ingates oriented in some other manner, such as but not limited to perpendicularly relative to the first cavity. As shown in FIG. 6, the magnetic force is applied to the liquid aluminum in the first cavity to cause the liquid aluminum to rotate. As shown in FIG. 7, the magnetic field is applied to the laminated stack 28 to cause the laminated stack 28 to rotate.

A speed of the rotation generated by the magnetic force is controlled by a field strength of the magnetic force. Increasing the magnetic force increases the speed of rotation, which increases the relative movement between the liquid aluminum and the conductor bars 36, thereby increasing the speed of the liquid aluminum and the drag force. Decreasing the magnetic force decreases the speed of rotation, which decreases the relative movement between the liquid aluminum and the conductor bars 36, thereby decreasing the speed of the liquid aluminum and the drag force. The field strength of the magnetic force may be calculated by Equation 4 below:

$$F = \frac{1}{\mu}(B \cdot \nabla)B - \frac{1}{2\mu}\nabla(B^2) \qquad 4)$$

wherein F is the electromagnetic volume force, $\mu$ is the permeability of the metal, B is the density of the magnetic field, and $\nabla$ is the magnetic field gradient.

While the best modes for carrying out the invention have been described in detail, those familiar with the art to which this invention relates will recognize various alternative designs and embodiments for practicing the invention within the scope of the appended claims.

The invention claimed is:

1. A method of manufacturing a rotor assembly for an electric device, the method comprising:
   stacking a plurality of laminated electric steel sheets to define a laminated stack having a first end surface and a second end surface axially spaced from the first end surface along a central axis, and a plurality of longitudinal grooves extending along the central axis between the first end surface and the second end surface, wherein the plurality of grooves are angularly spaced about and equidistant from the central axis;
   positioning one of a plurality of conductor bars in each of the plurality of longitudinal grooves such that a first end of each of the plurality of conductor bars extends outward beyond the first end surface of the laminated stack;
   positioning the laminated stack and the conductor bars in a mold having a first cavity that defines a first end ring;
   injecting liquid aluminum having a temperature greater than approximately six hundred sixty degrees Celsius (660° C.) into the first cavity of the mold;
   circulating the liquid aluminum within the first cavity and around the first ends of the conductor bars to heat the conductor bars to a temperature equal to or greater than approximately three hundred fifty degrees Celsius (350° C.) to reduce a bond strength between the conductor bars and any oxides formed on an outer surface of the conductor bars and to fracture any oxide films on the outer surface of the conductor bars;
   flushing the oxides away from the outer surface of the conductor bars with the circulating liquid aluminum; and
   cooling the liquid aluminum within the mold to form a first end ring over the first ends of the conductor bars.

2. The method as set forth in claim 1 wherein circulating the liquid aluminum is further defined as circulating the liquid aluminum at a speed sufficient to create a drag force on the oxides disposed on the outer surface of the conductor bars that is greater than the bond strength between the oxides and the conductor bars.

3. The method as set forth in claim 2 wherein the drag force is equal to:

$$F_D = \frac{1}{2}C_D \rho V^2 A$$

wherein $F_D$ is the drag force, $C_D$ is a drag coefficient, $\rho$ is the fluid density of the liquid aluminum, V is the velocity of the liquid aluminum circulating within the first cavity, and A is the interfacial area between the circulating liquid aluminum and the first ends of the conductor bars; wherein the velocity (V) of the liquid aluminum is equal to:

$$V = \left(\frac{2\sigma_b}{C_D \rho}\right)^{1/2}$$

wherein $\sigma_b$ is the bond strength between the oxides and the conductor bars.

4. The method as set forth in claim 2 wherein circulating the liquid aluminum within the first cavity is further defined as circulating the liquid aluminum within the first cavity at a speed less than a critical speed to prevent surface turbulence within the liquid aluminum adjacent the surface of the conductor bars.

5. The method as set forth in claim 4 wherein the critical speed is equal to:

$V_{crit}=2(\gamma g/\rho)^{1/4}$ wherein $V_{crit}$ is equal to the critical speed at which surface turbulence within the liquid aluminum adjacent the surface of the conductor bars develops, $\gamma$ is the surface tension of the liquid aluminum, g is the acceleration of gravity, and $\rho$ is the density of the liquid aluminum.

6. The method as set forth in claim 4 further comprising controlling the speed of the liquid aluminum circulating within the first cavity by adjusting at least one of an injection pressure of the liquid aluminum, a cross sectional area of one or more injection ingates, or a number of injection ingates through which the liquid aluminum is injected into the first cavity.

7. The method as set forth in claim 4 wherein circulating the liquid aluminum includes generating relative movement between the liquid aluminum and the first ends of the conductor bars.

8. The method as set forth in claim 7 wherein circulating the liquid aluminum includes moving the liquid aluminum to generate relative movement between the liquid aluminum and the first ends of the conductor bars.

9. The method as set forth in claim 7 wherein circulating the liquid aluminum includes moving the conductor bars to generate the relative movement between the liquid aluminum and the first ends of the conductor bars.

10. The method as set forth in claim 4 wherein injecting the liquid aluminum is further defined as injecting the liquid aluminum tangentially into the first cavity through a tangentially oriented ingate disposed on one of an outer diameter or an inner diameter of the first cavity to induce an annular flow of the liquid aluminum within the first cavity and about the first ends of the conductor bars.

11. The method as set forth in claim 10 wherein injecting the liquid aluminum into the first cavity is further defined as injecting the liquid aluminum into the first cavity through at least one ingate tangentially disposed on the outer diameter of the first cavity.

12. The method as set forth in claim 10 wherein injecting the liquid aluminum into the first cavity is further defined as injecting the liquid aluminum into the first cavity through at least one ingate tangentially disposed on the inner diameter of the first cavity.

13. The method as set forth in claim 4 wherein circulating the liquid aluminum within the first cavity includes applying a magnetic force to one of the liquid aluminum in the first cavity or the laminated stack to generate rotation in the one of the liquid aluminum or the laminated stack relative to the other of the liquid aluminum and the laminated stack to produce relative movement between the liquid aluminum and the conductor bars.

14. The method as set forth in claim 13 wherein a speed of the rotation generated by the magnetic force is controlled by a field strength of the magnetic force, wherein the field strength of the magnetic force is equal to:

$$F = \frac{1}{\mu}(B\cdot\nabla)B - \frac{1}{2\mu}\nabla(B^2)$$

wherein F is the electromagnetic volume force, $\mu$ is the permeability of the metal, B is the density of the magnetic field, and $\nabla$ is the magnetic field gradient.

15. The method as set forth in claim 1 further comprising brushing the first ends of each of the conductor bars to remove at least a portion of the oxides disposed on the outer surface of the conductor bars.

16. The method as set forth in claim 1 wherein the liquid aluminum includes one of a pure aluminum material, a conductor grade aluminum wrought alloy material, a cast aluminum alloy material.

17. The method as set forth in claim 1 wherein the conductor bars include and are manufactured from an aluminum alloy having a melting point of at least six hundred degrees Celsius (600° C.).

18. A method of manufacturing a rotor assembly for an electric device, the method comprising:
   stacking a plurality of laminated electric steel sheets to define a laminated stack having a first end surface and a second end surface axially spaced from the first end surface along a central axis, and a plurality of longitudinal grooves extending along the central axis between the first end surface and the second end surface, wherein the plurality of grooves are angularly spaced about and equidistant from the central axis;
   positioning one of a plurality of conductor bars in each of the plurality of longitudinal grooves such that a first end of each of the plurality of conductor bars extends outward beyond the first end surface of the laminated stack;
   positioning the laminated stack and the conductor bars in a mold having a first cavity that defines a first end ring;
   injecting liquid aluminum having a temperature greater than approximately six hundred sixty degrees Celsius (660° C.) into the first cavity of the mold;
   circulating the liquid aluminum within the first cavity and around the first ends of the conductor bars to generate relative movement between the liquid aluminum and the first ends of the conductor bars to heat the conductor bars to a temperature equal to or greater than approximately three hundred fifty degrees Celsius (350° C.) to reduce a bond strength between the conductor bars and any oxides formed on an outer surface of the conductor bars and to fracture any oxide films on the outer surface of the conductor bars, wherein the liquid aluminum is circulated at a speed sufficient to create a drag force on the oxides disposed on the outer surface of the conductor bars that is greater than the bond strength between the oxides and the conductor bars, and that is less than a critical speed to prevent surface turbulence within the liquid aluminum adjacent the surface of the conductor bars;
   controlling the speed of the liquid aluminum circulating through the first cavity to maintain the drag force at a level greater than the bond strength while not exceeding the critical velocity of the liquid aluminum;
   flushing the oxides away from the outer surface of the conductor bars with the circulating liquid aluminum; and
   cooling the liquid aluminum within the mold to form a first end ring over the first ends of the conductor bars.

19. The method as set forth in claim 18 wherein injecting the liquid aluminum is further defined as injecting the liquid aluminum tangentially into the first cavity through a tangentially oriented ingate disposed on one of an outer diameter or an inner diameter of the first cavity to induce an annular flow of the liquid aluminum within the first cavity and about the first ends of the conductor bars.

20. The method as set forth in claim 18 wherein circulating the liquid aluminum within the first cavity includes applying a magnetic force to one of the liquid aluminum in the first cavity or the laminated stack to generate rotation in the one of the liquid aluminum or the laminated stack relative to the other of the liquid aluminum and the laminated stack to produce relative movement between the liquid aluminum and the conductor bars.

* * * * *